(12) United States Patent
Moriyama et al.

(10) Patent No.: US 12,227,132 B2
(45) Date of Patent: *Feb. 18, 2025

(54) DOOR MIRROR STRUCTURE

(71) Applicant: MAZDA MOTOR CORPORATION, Hiroshima (JP)

(72) Inventors: Yukihiro Moriyama, Hiroshima (JP); Atsushi Yakushinji, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 208 days.

This patent is subject to a terminal disclaimer.

(21) Appl. No.: 17/820,487

(22) Filed: Aug. 17, 2022

(65) Prior Publication Data

US 2023/0111823 A1  Apr. 13, 2023

(51) Int. Cl.
   *B60J 5/04*   (2006.01)
   *B60J 1/08*   (2006.01)
   *B60R 1/074*  (2006.01)

(52) U.S. Cl.
   CPC ............ *B60R 1/074* (2013.01); *B60J 1/08* (2013.01); *B60J 5/04* (2013.01); *B60J 5/0411* (2013.01)

(58) Field of Classification Search
   CPC ........... B60R 1/006; B60R 1/074; B60R 1/08; B60R 1/06; B60R 1/0612; B60R 1/02; B60R 1/0617; B60R 1/062; B60J 5/0411; B60J 5/0468; B60J 1/14
   USPC ..................................................... 296/1.11
   See application file for complete search history.

(56) References Cited

U.S. PATENT DOCUMENTS

| | | | | |
|---|---|---|---|---|
| 4,030,692 | A * | 6/1977 | Szilagyi | B60R 1/06 248/487 |
| 11,981,262 | B2 * | 5/2024 | Moriyama | B60R 1/006 |
| 2006/0132282 | A1 * | 6/2006 | McCall | B60R 1/12 340/5.2 |
| 2015/0266423 | A1 * | 9/2015 | Tada | B22D 25/02 248/475.1 |
| 2018/0170265 | A1 * | 6/2018 | Boehm | G02F 1/133382 |
| 2020/0269665 | A1 * | 8/2020 | Kimura | B60J 5/0468 |
| 2020/0339036 | A1 | 10/2020 | Kenmochi et al. | |
| 2022/0073000 | A1 * | 3/2022 | Yamashita | F16M 13/022 |
| 2023/0110177 | A1 * | 4/2023 | Moriyama | B60R 1/074 359/841 |

(Continued)

FOREIGN PATENT DOCUMENTS

| | | | | |
|---|---|---|---|---|
| JP | H0647358 | * | 6/1994 | ............. B60R 1/074 |
| JP | 2020-179680 A | | 11/2020 | |

*Primary Examiner* — Gregory A Blankenship
(74) *Attorney, Agent, or Firm* — Studebaker & Brackett PC

(57) ABSTRACT

A door mirror structure comprises a door-mirror body portion, a mirror base having a tip-end portion fixed to the door-mirror body portion and a base-end portion provided away from the tip-end portion, a rotational support axis connected to the base-end portion and rotatably supporting the door-mirror body portion and the mirror base between a mirror-use position and a mirror-storage position, and an electromotive rotational unit provided to rotate the door-mirror body portion and the mirror base between the mirror-use position and the mirror-storage position around an axis line of the rotational support axis. The electromotive rotational unit is provided at a side door. The rotational support axis is provided to be inclined such that an upper side thereof is located on an inward side in a vehicle width direction.

10 Claims, 17 Drawing Sheets

(56) References Cited

U.S. PATENT DOCUMENTS

| | | | |
|---|---|---|---|
| 2023/0110322 A1* | 4/2023 | Moriyama | B60R 1/074 |
| | | | 359/841 |
| 2023/0110906 A1* | 4/2023 | Moriyama | B60J 5/0404 |
| | | | 296/146.6 |
| 2023/0111823 A1* | 4/2023 | Moriyama | B60J 1/08 |
| | | | 296/1.11 |
| 2023/0116537 A1* | 4/2023 | Moriyama | B60R 1/006 |
| | | | 248/479 |
| 2023/0116727 A1* | 4/2023 | Moriyama | B60J 5/0426 |
| | | | 296/146.6 |
| 2024/0042932 A1* | 2/2024 | De Wind | B60R 1/0602 |
| 2024/0083357 A1* | 3/2024 | D'Andrea | B60R 1/062 |

* cited by examiner

DOOR MIRROR STRUCTURE

BACKGROUND OF THE INVENTION

The present invention relates to a door mirror structure.

Conventionally, a door mirror structure which is provided with an electromotive rotational unit in order to automatically rotate a door mirror between a usable position and a storage position is known as described in Japanese Patent Laid-Open Publication No. 2020-179680 (US 2020/0339036 A1).

This door mirror structure comprises a door-mirror body portion provided with a mirror, a mirror base protruding, in a vehicle width direction, from a side door, and the electromotive rotational unit stored in the door-mirror body portion. The mirror base is a portion which has a base-end portion and a tip-end portion, extends in the vehicle width direction, and forms an arm portion of the door mirror. The base-end portion of the mirror base is fixed to the side door, and to the tip-end portion of the mirror base is attached the door-mirror body portion so as to rotate around a rotational axis extending in a vertical direction.

The door-mirror body portion is rotated at the tip-end portion of the mirror base by receiving a rotational drive force of the electromotive rotational unit stored therein, so that the door-mirror body portion is rotatable between the mirror-use position and the mirror-storage position. The mirror-use position is the position where the door-mirror body portion protrudes toward an outward side, in the vehicle width direction, from the tip-end portion of the mirror base and the mirror is visible from a cabin inside. Meanwhile, the mirror-storage position is the one where the door-mirror body portion extends substantially in parallel to the side door.

In the above-described door mirror structure, since the electromotive rotational unit is stored inside the door-mirror body portion, a moment applied in a vertical direction which is generated at a position of the electromotive rotational unit becomes large in proportion to the length of the mirror base. Consequently, there is a problem that vibrations of the mirror generated during vehicle traveling may become improperly large.

Further, since the electromotive rotational unit is stored inside the door-mirror body portion, the longitudinal width (i.e., the width in a vehicle longitudinal direction) of the door-mirror body portion becomes large. Consequently, there is a concern that the visibility from the cabin inside may be hindered by the door-mirror body portion.

Moreover, since the above-described structure is configured such that the base-end portion of the mirror base is fixed to the side door and the door-mirror body portion is rotated at the tip-end portion of the mirror base, in a case of a vehicle which is designed to require a sufficient length, in a width direction, of the mirror base, the mirror base protrudes from an outer panel to a certain degree even if the door-mirror body portion is rotated to the mirror-storage position. Accordingly, a vehicle width in a mirror-storage state is not reduced sufficiently, so that the vehicle's requirement of reducing the vehicle width in the mirror-storage state may not be met properly.

Additionally, since the door-mirror body portion protrudes outwardly, in the vehicle width direction, from the side door, improvement of appearance of the vehicle may become difficult and there is a concern that the door mirror may contact an object outside the vehicle.

SUMMARY OF THE INVENTION

The present invention has been devised in view of the above-described problems, and an object of the present invention is to provide a door mirror structure which can attain suppression of the mirror vibrations during the vehicle traveling, improvement of the visibility from the cabin inside, reduction of the vehicle width in the mirror-storage state, improvement of the vehicle appearance, and avoidance of contacting with the object outside vehicle.

The present invention is a door mirror structure of the a side door for a vehicle provided with an outer panel which comprises a door-mirror body portion provided with a mirror to obtain a rearward visual field of the vehicle, a mirror base having a tip-end portion fixed to the door-mirror body portion and a base-end portion provided away from the tip-end portion, a rotational support axis connected to the base-end portion of the mirror base and rotatably supporting the door-mirror body portion and the mirror base between a mirror-use position where the mirror is visible from a cabin inside and a mirror-storage position which is located on an inward side, in a vehicle width direction, of the mirror-use position, and an electromotive rotational unit provided to rotate the door-mirror body portion and the mirror base between the mirror-use position and the mirror-storage position around an axis line of the rotational support axis, wherein the electromotive rotational unit is provided to the side door, and the rotational support axis is provided to be inclined such that an upper side thereof is located on an inward side in the vehicle width direction.

According to the present invention, since the electromotive rotational unit, which is a heavy object, is provided at the side door, the vertical moment generated at the door mirror which is caused by a road-surface input during the vehicle traveling (i.e., vibrations or outer forces which are mainly generated in a vertical direction, which may be caused by an unevenness (concave/convex) of the road surface) can be decreased, so that the vibrations of the mirror can be suppressed.

Further, since the electromotive rotational unit is provided at the side door, the longitudinal width of the door-mirror body portion can be shortened compared with a conventional door-mirror structure in which the electromotive rotational unit is stored inside the door-mirror body portion, so that the visibility from the cabin inside can be improved.

Moreover, in the above-described structure comprising the door-mirror body portion provided with the mirror and the mirror base having the tip-end portion fixed to the door-mirror body portion, the electromotive rotational unit rotates the door-mirror body portion and the mirror base from the mirror-use position to the mirror-storage position. Accordingly, in a state where the door-mirror body portion and the mirror base are rotated to the mirror-storage position, respective protrusion quantities of the door-mirror body portion and the mirror base which protrude from a side face of the side door can be made small, so that the vehicle width can be properly minimized.

Additionally, in the above-described structure, since the rotational support axis is provided to be inclined such that its upper side is located on the inward side in the vehicle width direction, the door-mirror body portion taking the mirror-storage position can be stored in a state where it falls down toward a surface of the outer panel and approaches the outer panel, without contacting the outer panel. Consequently, the vehicle appearance in the mirror-storage state of the door mirror can be improved and also the contacting of the door mirror with the object outside the vehicle can be avoided.

In the above-described door mirror structure, it is preferable that the electromotive rotational unit be provided inside the side door. According to this structure, the electromotive rotational unit can be protected from a foreign substance or the like which exist in the vehicle outside by an outside face of the side door.

In the above-described door mirror structure, it is preferable that a penetration hole where the rotational support axis passes be formed at the outer panel, and a cover member which covers a gap between the penetration hole and the rotational support axis from a vehicle outside be further provided.

According to this structure, since the cover member covers the gap between the penetration hole and the rotational support axis, the appearance of the vehicle is improved and also water can be prevented from coming into the inside of the outer panel through the above-described gap.

In the above-described door mirror structure, it is preferable that this structure further comprise a support member to fix the electromotive rotational unit to the side door, wherein the electromotive rotational unit be fixed to a beltline reinforcement which extends in a vehicle longitudinal direction along a beltline at a window lower-end edge of the side door by the support member.

According to this structure, since the electromotive rotational unit is fixed to the beltline reinforcement which constitutes a frame of the side door, the support rigidity of the electromotive rotational unit is improved.

In the above-described door mirror structure, it is preferable that the rotational support axis be provided to be inclined such that the upper side thereof is located on a vehicle forward side.

According to this structure, the rotational support axis is provided to be inclined such that its upper side is located not only on the inward side in the vehicle width direction but on the vehicle forward side. The door-mirror body portion taking the mirror-storage position can be stored in a state where it is positioned upwardly and inwardly, in the vehicle width direction, relative to the outer panel, without contacting the outer panel of the side door. Consequently, the vehicle appearance in the mirror-storage state of the door mirror can be improved and also the contacting of the door mirror with the object outside the vehicle can be avoided.

In the above-described door mirror structure, it is preferable that the side door further comprise a door glass provided at an upper side of the outer panel, and said door glass be provided to be inclined such that an upper side thereof is located on the inward side in the vehicle width direction.

According to this structure, since the door glass is provided to be inclined such that its upper side is located on the inward side in the vehicle width direction, the door-mirror body portion taking the mirror-storage position falls down toward the door glass, so that the door-mirror body portion comes to take a parallel or nearly-parallel position relative to the door glass. Consequently, the vehicle appearance in the mirror-storage state is further improved.

In the above-described door mirror structure, it is preferable that the rotational support axis be fixed to the base-end portion of the mirror base and configured to be rotatable around the axis line of the rotational support axis together with the mirror base by receiving a rotational drive force of the electromotive rotational unit.

According to this structure, the door-mirror body portion and the mirror base can be rotated between the mirror-use position and the mirror-storage position by rotating the door-mirror body portion and the mirror base around the rotational support axis by means of the electromotive rotational unit. Accordingly, rotating of the door-mirror body portion and the mirror base between the mirror-use position and the mirror-storage position can be materialized with a simple structure.

Thus, according to the door mirror structure of the present invention, the suppression of the mirror vibrations during the vehicle traveling and the improvement of the visibility from the cabin inside can be attained. Moreover, the reduction of the vehicle width in the mirror-storage state, the improvement of the vehicle appearance, and the avoidance of contacting with the object outside vehicle can be attained at the same time.

The present invention will become apparent from the following description which refers to the accompanying drawings.

DETAILED DESCRIPTION OF THE INVENTION

Hereafter, a preferable embodiment of the present invention will be described referring to the accompanying drawings.

Figure 1:
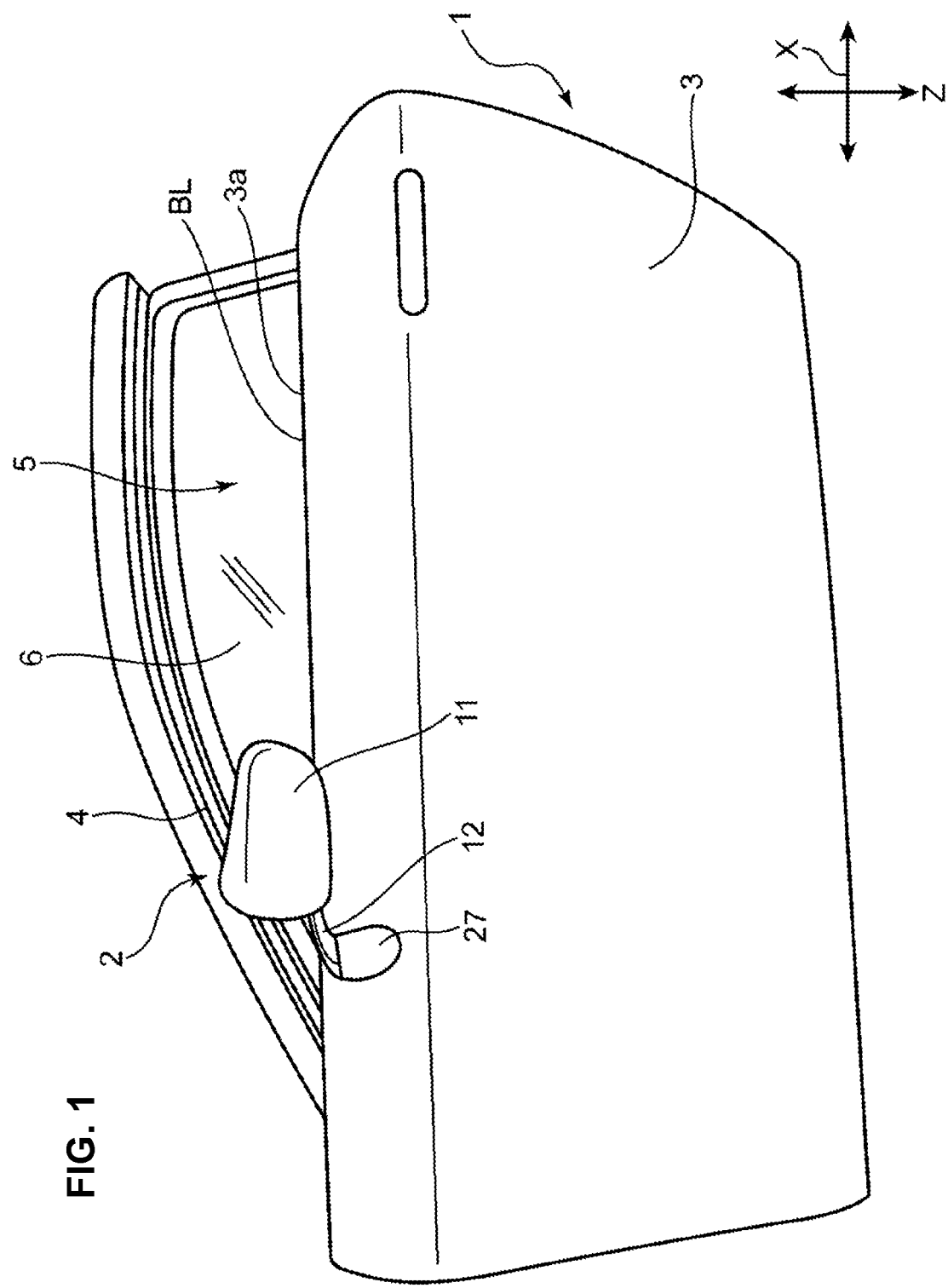
FIG. 1 is a perspective view showing a whole structure of a side door with a door mirror to which a door mirror structure according to an embodiment of the present invention is applied.
Figure 2:
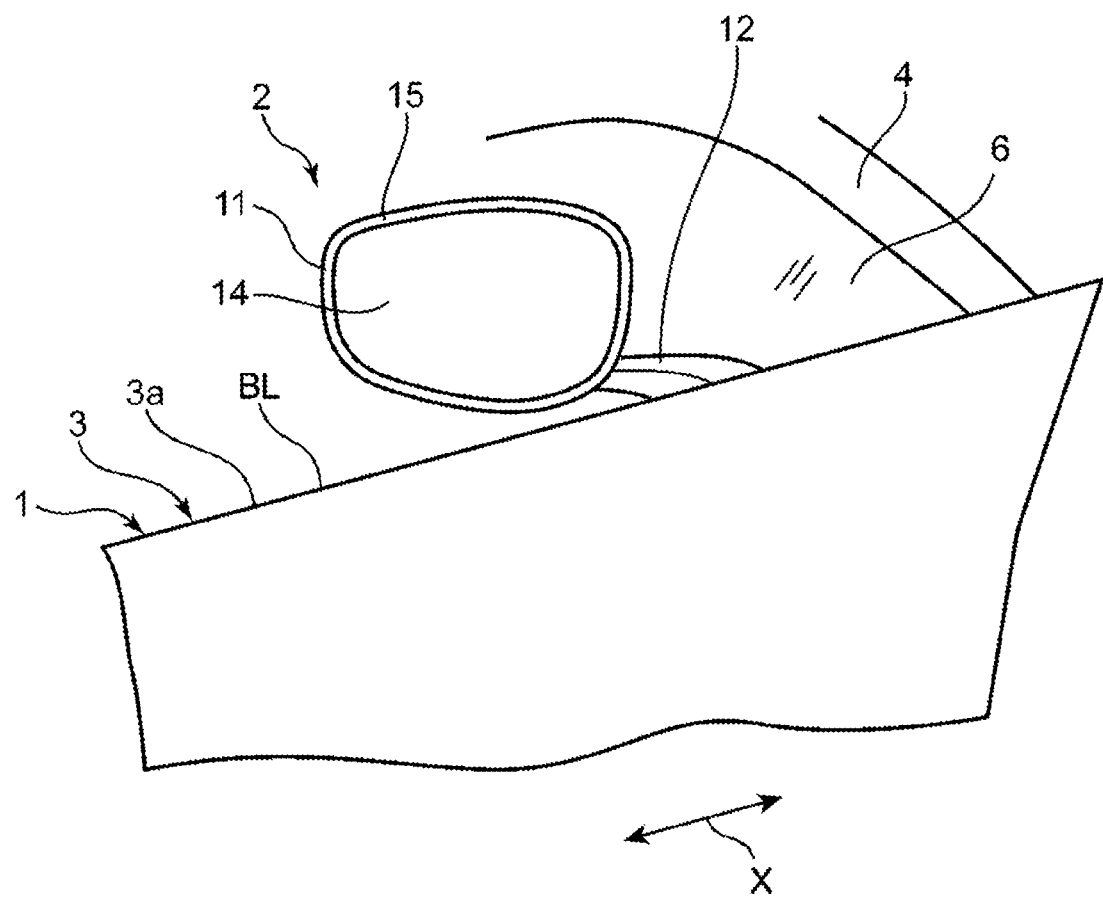
FIG. 2 is a view of the door mirror shown in FIG. 1, when viewed from a cabin inside.
Figure 3:
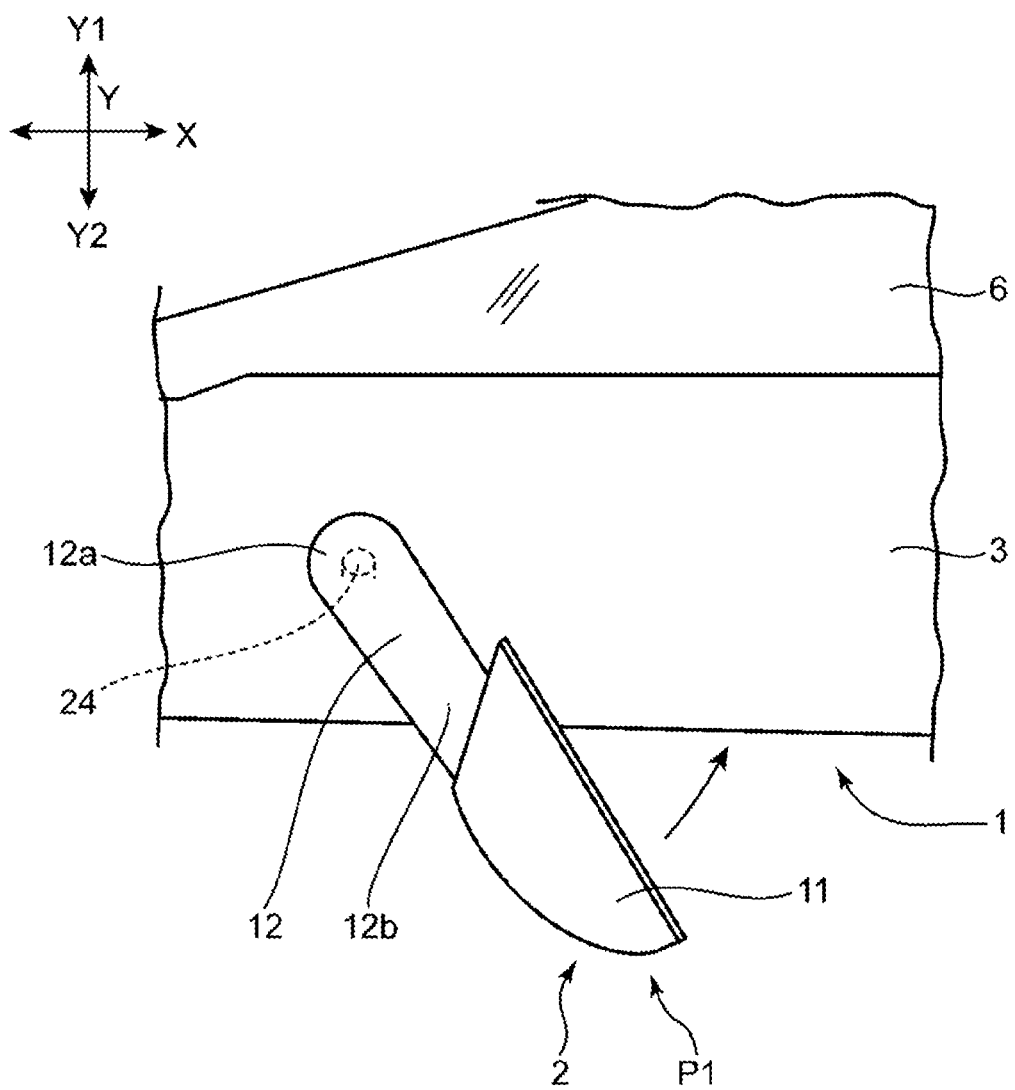
FIG. 3 is a plan view showing a state where the door mirror shown in FIG. 1 takes its use position.

FIGS. 1 and 2 show a side door 1 of a vehicle to which a door mirror structure of the present invention is applied. The side door 1 is configured such that a door mirror 2 is arranged near a beltline BL at an upper end 3a of an outer panel 3 and on a vehicle rearward side of an A pillar 4. A door glass 6 is arranged at a door opening portion 5 which is enclosed by the A pillar 4 and the beltline BL.

Figure 16:
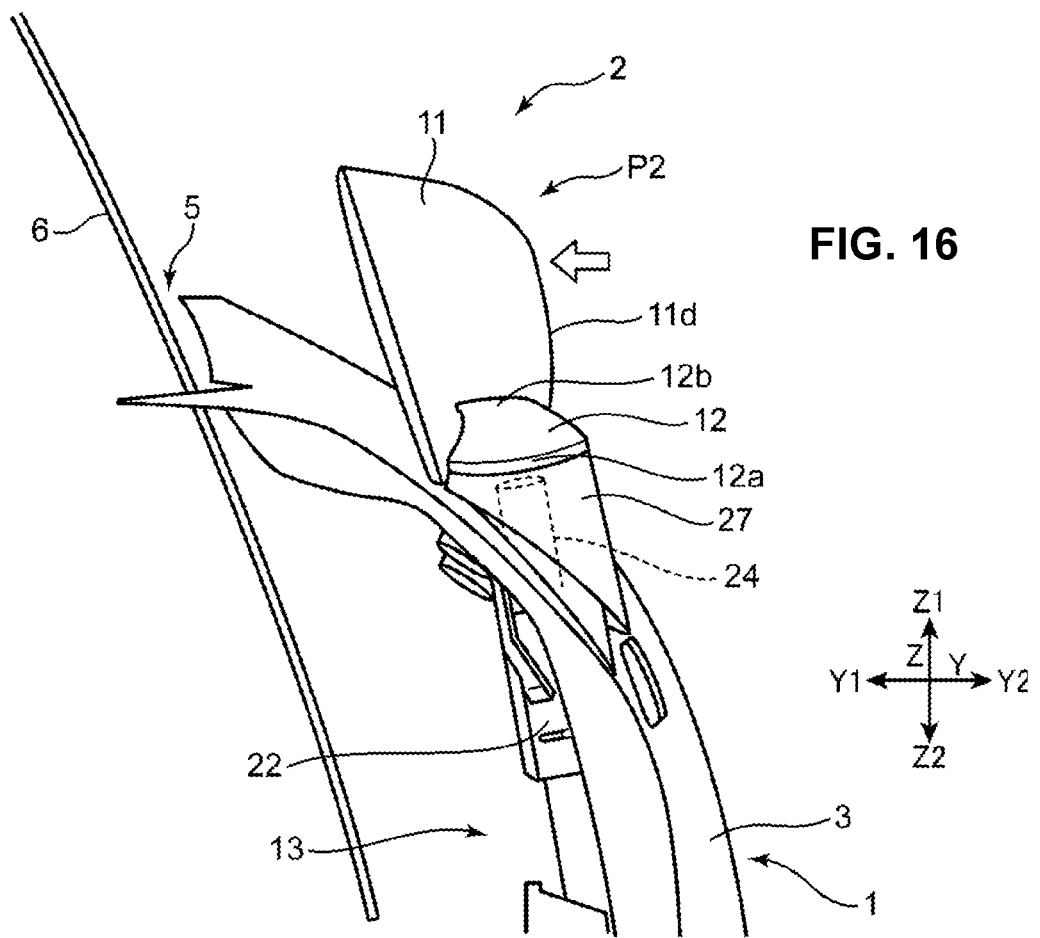
FIG. 16 is a view of the door mirror shown in FIG. 1 taking its storage position, when viewed from the vehicle forward side, which explains a state where the door-mirror body portion falls down toward an outer panel and approaches the outer panel due to an inwardly-inclined rotational support axis.

The door opening portion 5 is positioned at an upper side Z1 and an inward side Y1, in a vehicle width direction Y, of the outer panel 3 at the side door 1 as shown in FIG. 16. Further, the door glass 6 is provided to be inclined such that its upper side Z1 is located on the inward side Y1 in the vehicle width direction at an upper side of the outer panel 3.

The door mirror structure of the side door 1 of the vehicle according to the present embodiment is the one where the door mirror 2 which is storable in an electromotive manner is attached to the side door 1 as shown in FIGS. 1-7. Specifically, the door mirror structure primarily comprises a door-mirror body portion 11 and a mirror base 12 which constitute the door mirror 2 and an electromotive rotational unit 13 for rotating the door-mirror body portion 11 and the mirror base 12. The electromotive rotational unit 13 is arranged inside the side door 1.

Further, the door mirror structure of the present embodiment comprises a rotational support axis 24 (see FIGS. 11 and 12) which rotatably supports the door-mirror body portion 11 and the mirror base 12, a beltline reinforcement 21 as a frame member inside the side door 1, a support member 22 which fixes the electromotive rotational unit 13 to the beltline reinforcement 21, and a cover member 27 which is provided at a vehicle outside of the side door 1.

Hereafter, respective structural elements of the door mirror structure will be described in order.

As shown in FIG. 2, the door-mirror body portion 11 is provided with a mirror 14 to obtain a rearward visual field of the vehicle and a housing 15. The mirror 14, which is an optical mirror to reflect light, is held at a rearward face (specifically, a face which is directed toward a vehicle rearward side in a state where the mirror 14 takes a mirror-use position P1 shown in FIG. 3) of the housing 15. Further, inside the housing 15 of the door-mirror body portion 11 are stored an inner device 37 (see FIG. 12), such as a mirror-face adjusting unit for angle adjusting of a vertical direction Z and the vehicle width direction Y of the mirror 14 or a defrosting unit for the mirror 14.

The mirror base 12, which is a section to constitute an arm portion of the door mirror 2, comprises a tip-end portion 12b which is fixed to the door-mirror body portion 11 and a base-end portion 12a which is provided away from the tip-end portion 12b as shown in FIGS. 3-6.

Further specifically, the door-mirror body portion 11 is fixed to the tip-end portion 12b of the mirror base 12 such that the mirror 14 and the mirror base 12 are nearly parallel to each other.

The base-end portion 12a of the mirror base 12 is attached to the side door 1 such that the door-mirror body portion 11 and the mirror base 12 are rotatable between the mirror-use position P1 where the mirror 14 is visible from a cabin inside through the door opening portion 5 and a mirror-storage position P2 which is located on the inward side, in the vehicle width direction Y, of the mirror-use position P1.

Figure 4:
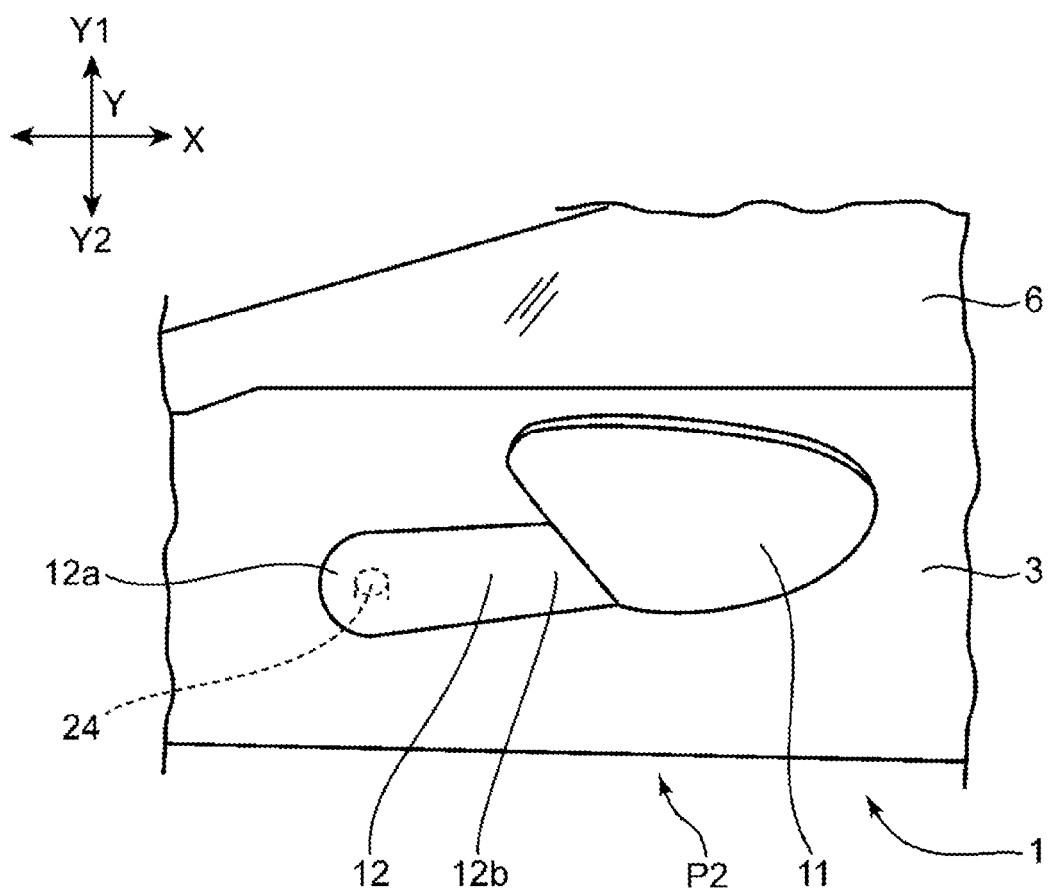
FIG. 4 is a plan view showing a state where the door mirror shown in FIG. 1 takes its storage position.
Figure 5:
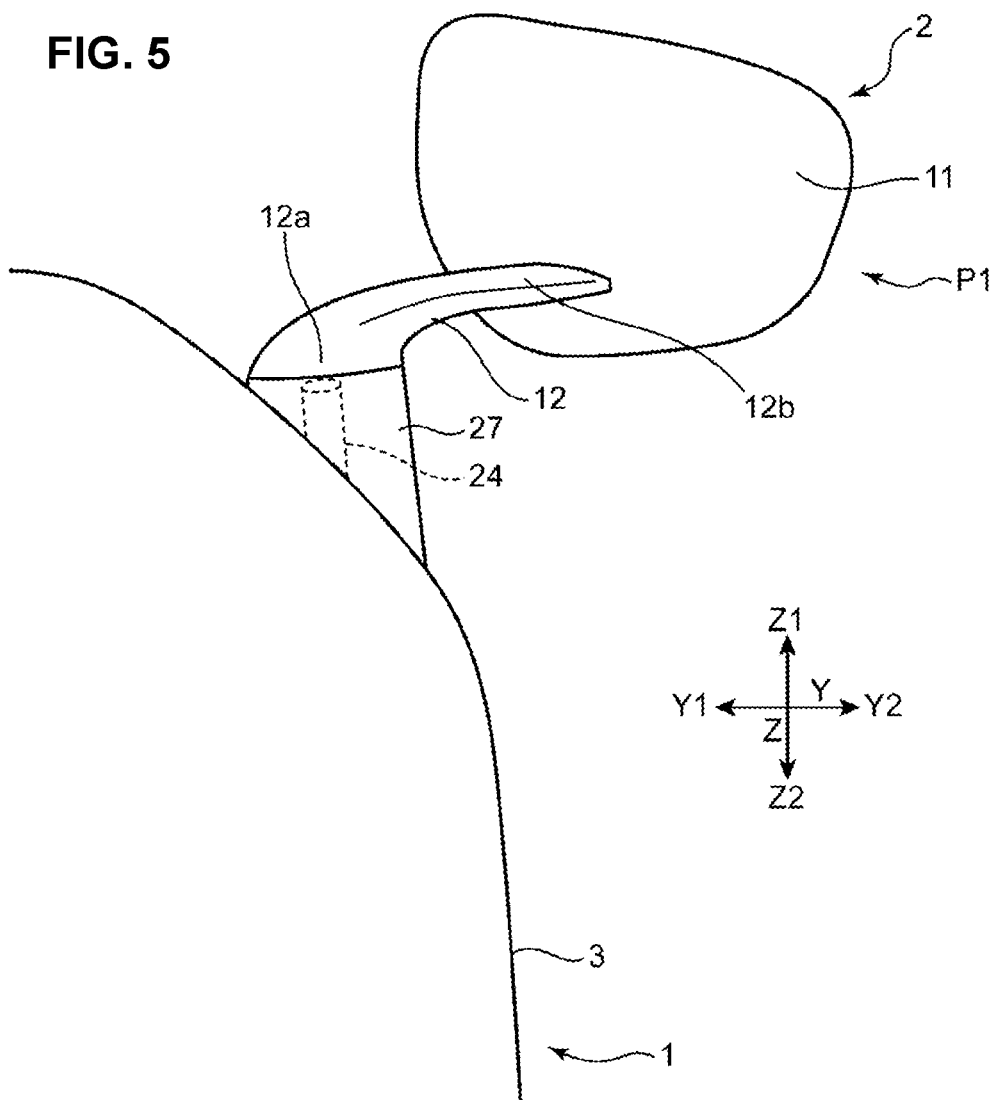
FIG. 5 is a view showing the state where the door mirror shown in FIG. 1 takes its use position, when viewed from a vehicle forward side.
Figure 6:
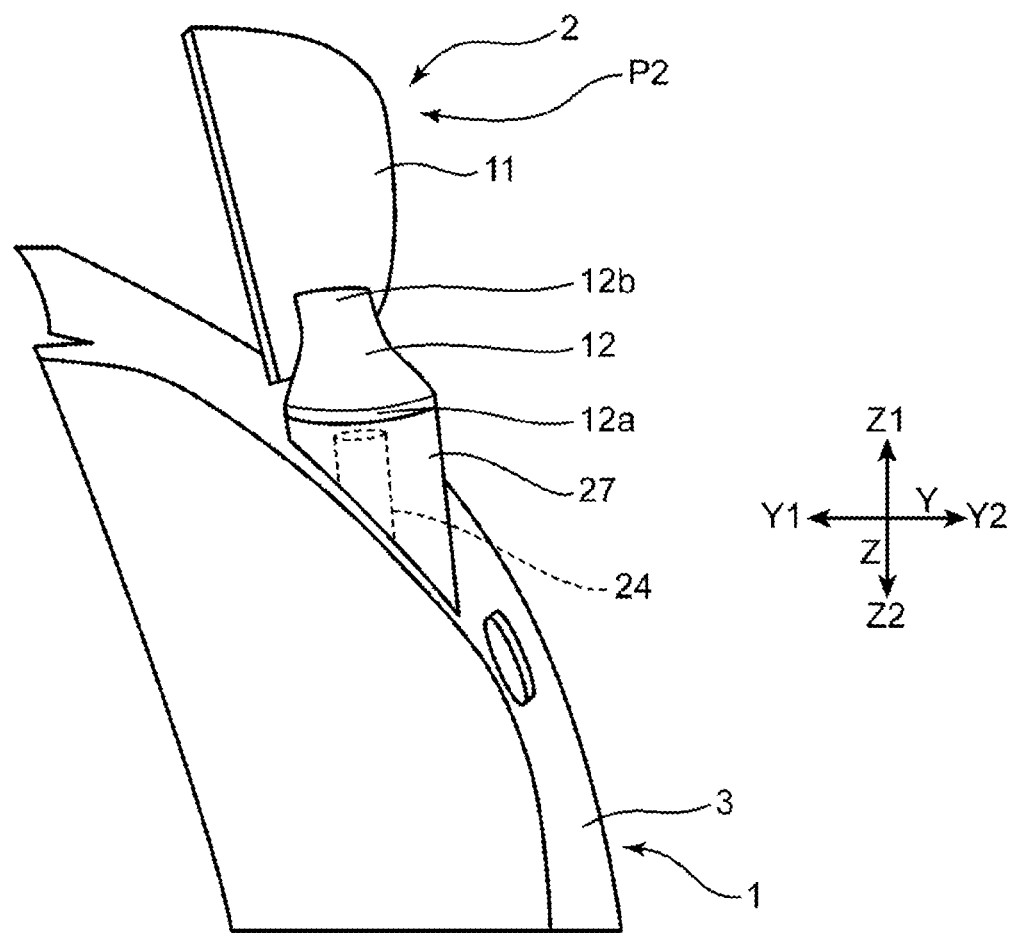
FIG. 6 is a view showing the state where the door mirror shown in FIG. 1 takes its storage position, when viewed from the vehicle forward side.

In the present embodiment, the rotational support axis 24 shown in FIGS. 9-12 is connected to the base-end portion 12a of the mirror base 12 and rotatably supports the door-mirror body portion 11 and the mirror base 12 between the mirror-use position P1 (see FIGS. 3 and 5) and the mirror-storage position P2 (see FIGS. 4 and 6).

The rotational support axis 24 extends from the base-end portion 12a into the side door 1 and is rotated by the electromotive rotational unit 13.

Specifically, as shown in FIGS. 9-12, a penetration hole 26 is formed at the outer panel 3 which constitutes an outside face of the side door 1. The rotational support axis 24 passes through the penetration hole 26 of the outer panel 3 and is coaxially connected to an output axis 35 (see FIG. 12) described later of the electromotive rotational unit 13 which is arranged in a space portion 20 inside the side door 1.

Figure 12:
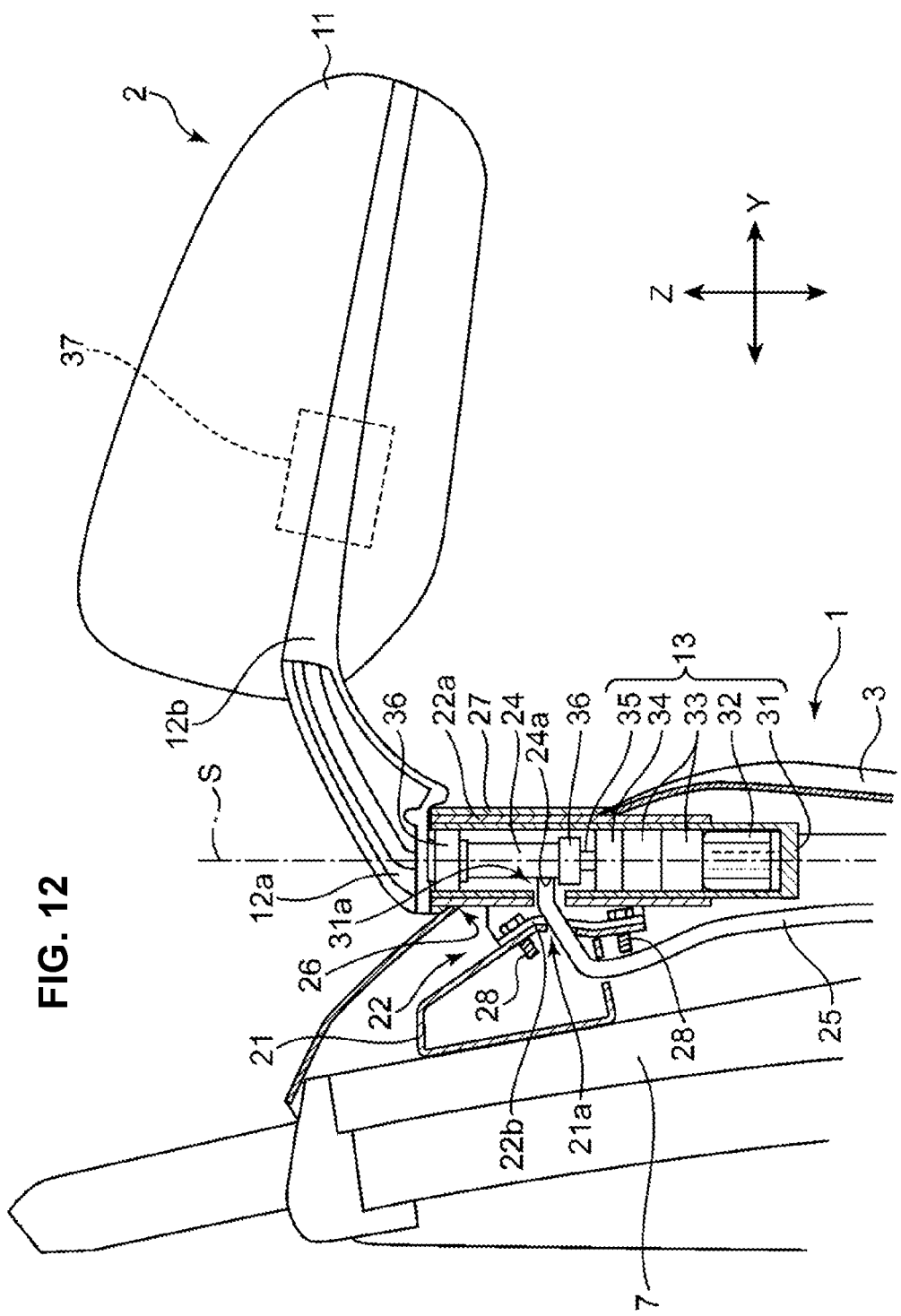
FIG. 12 is a sectional view taken along line XII-XII of FIG. 8, where the cover member is added.

The electromotive rotational unit 13 is configured to rotate the door-mirror body portion 11 and the mirror base 12 between the mirror-use position P1 and the mirror-storage position P2. Specifically, the electromotive rotational unit 13 comprises, as shown in FIG. 12, a casing 31, a motor 32, a reduction gear 33 to reduce a generation torque of the motor 32, a torque limiter 34, and the output axis 35 to output a rotational drive force. The casing 31 stores the motor 32, the reduction gear 33, the torque limiter 34, and the output axis 35 therein. Further, the rotational support axis 24 and a journal 36 to rotationally support the rotational support axis 24 are also stored in the casing 31. Accordingly, the motor 32, the reduction gear 33, the torque limiter 34, and the output axis 35, which are primary structural elements of the electromotive rotational unit 13, are arranged on the axis line of the rotational support axis 24. The output axis 35 is connected to the rotational support axis 24 integrally rotationally.

Herein, in a case where an excessive torque is generated at the rotational support axis 24 when the motor 31 is driven, the torque limiter 34 cuts transmission of the torque, so that a load of the motor 32 can be suppressed.

A ball bearing or a roller bearing which can support the rotational support axis 24 with a small rotational resistance are preferable as the journal 36.

Figure 8:
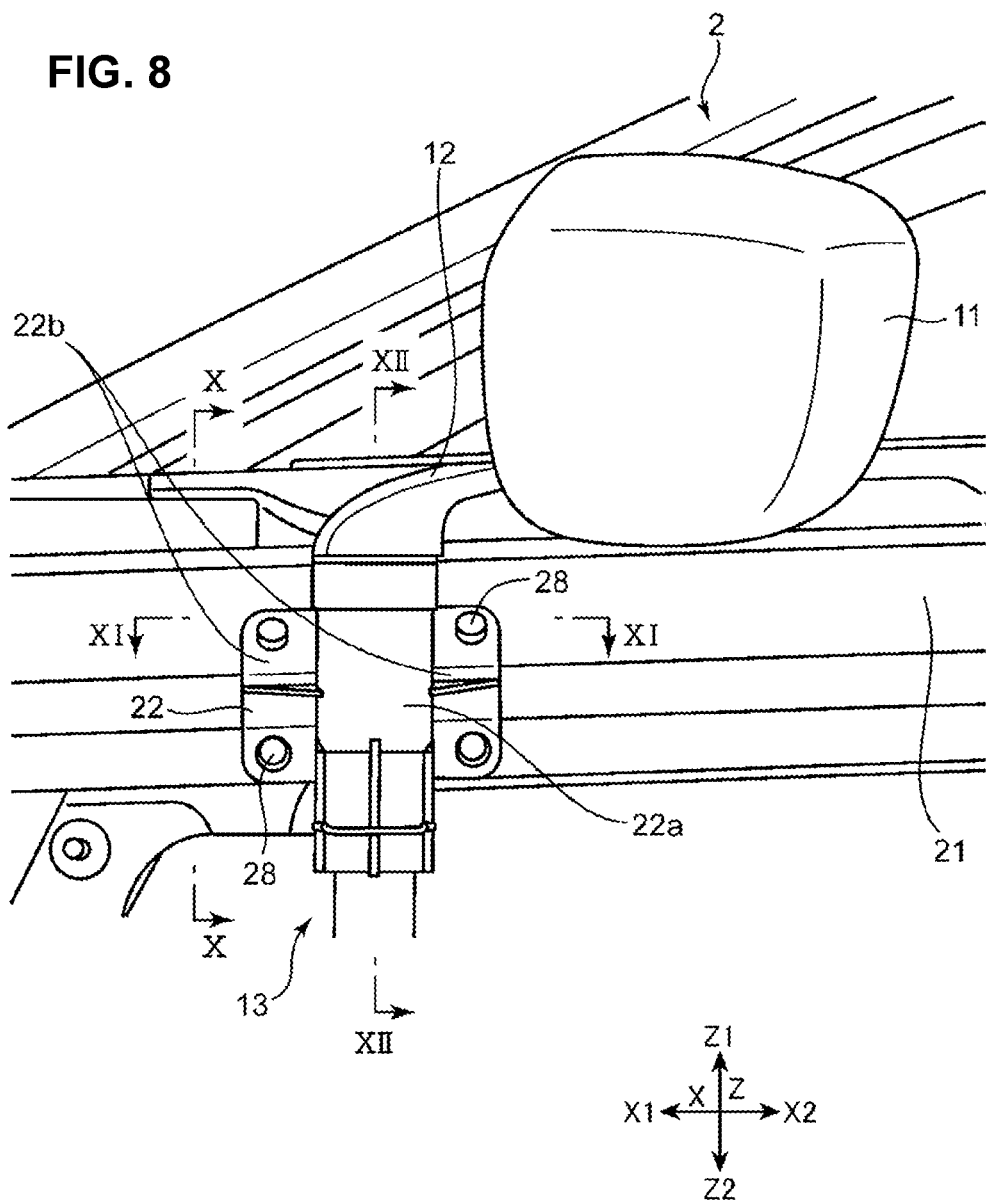
FIG. 8 is an enlarged view showing a state where the door mirror and an electromotive rotational unit are fixed to the beltline reinforcement shown in FIG. 7.
Figure 9:
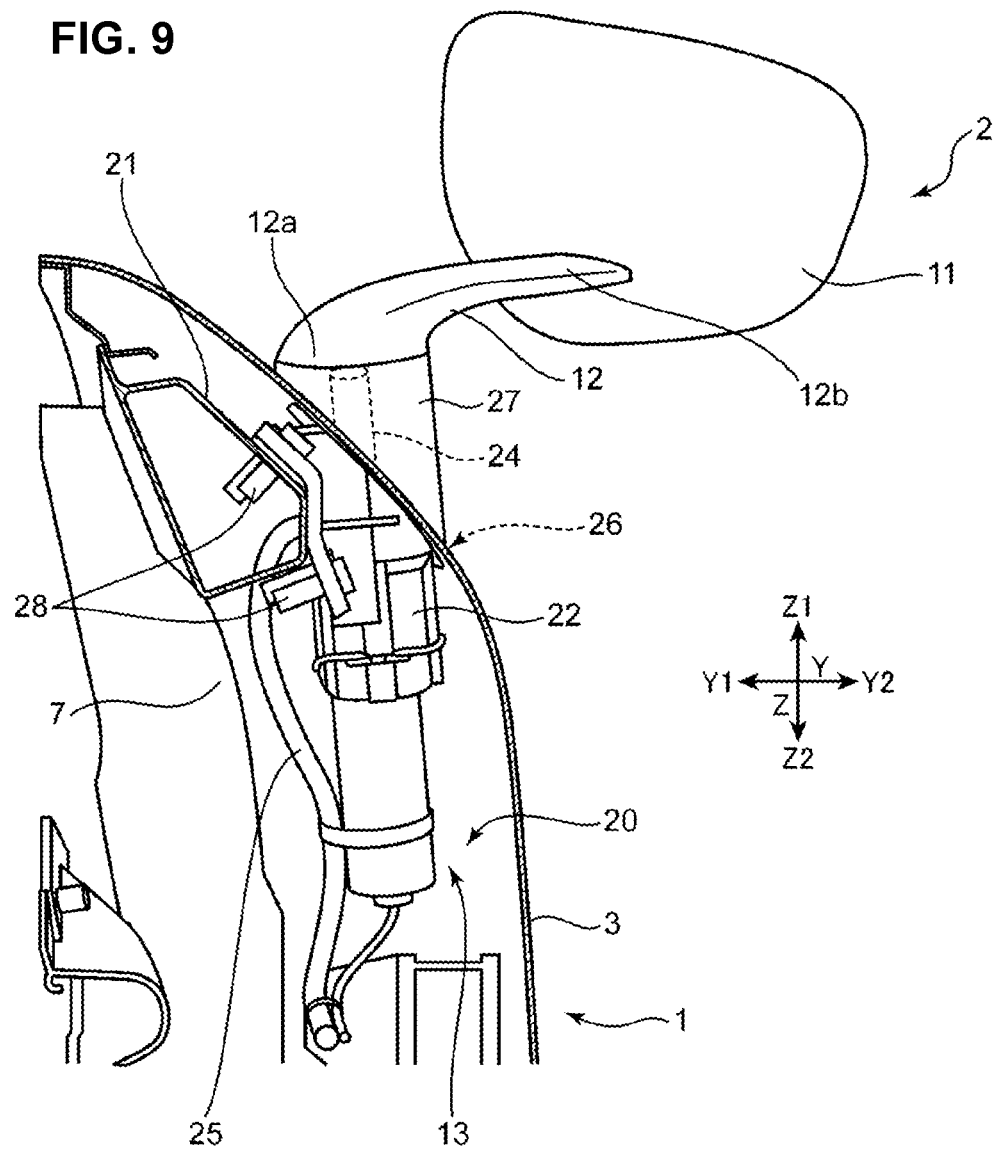
FIG. 9 is a sectional view taken along line X-X of FIG. 8, where a cover member is added.
Figure 10:
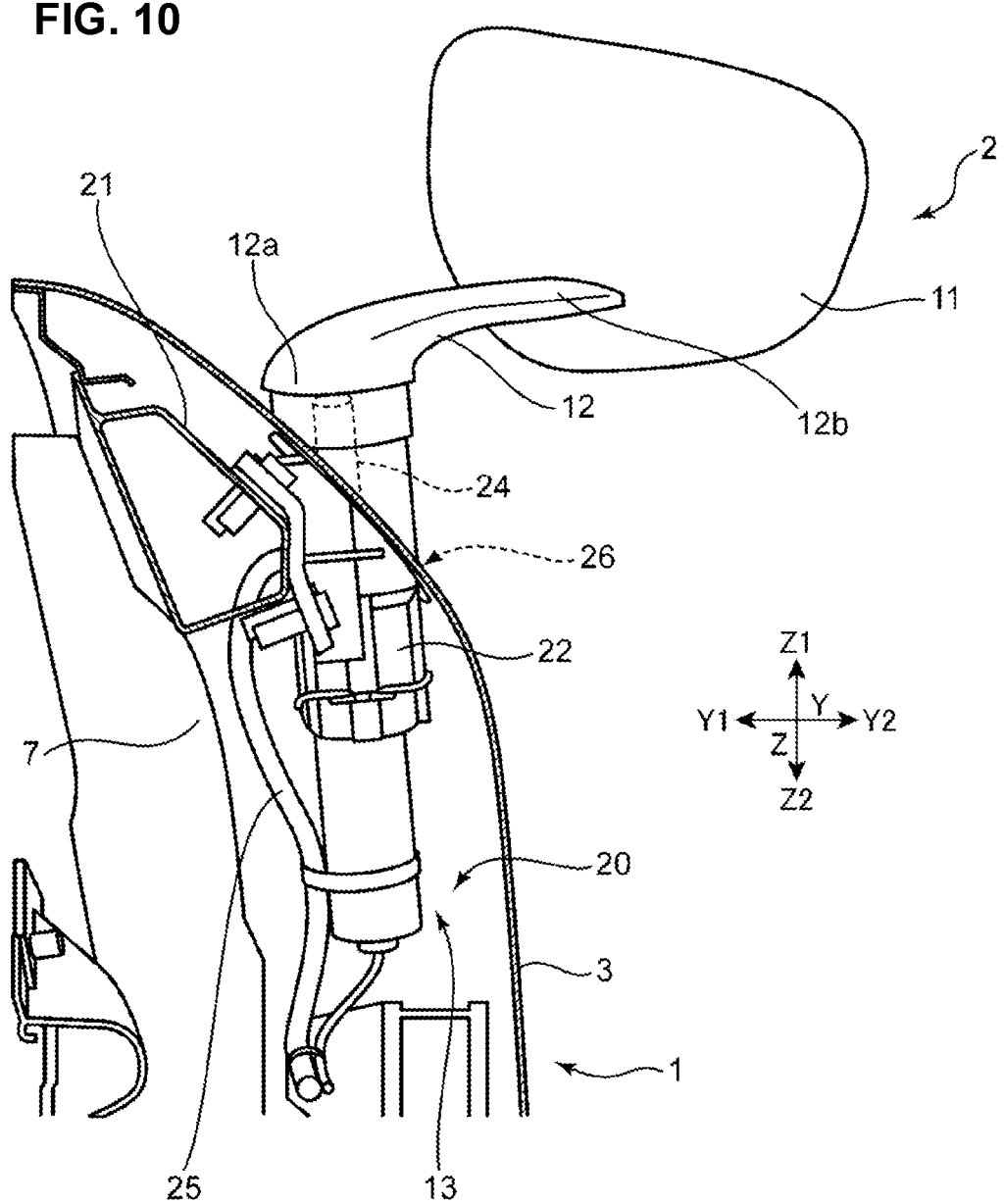
FIG. 10 is a sectional view taken along line X-X of FIG. 8.

The electromotive rotational unit 13 is fixed to the beltline reinforcement 21 by the support member 22. In the present embodiment, the electromotive rotational unit 13 is, as shown in FIGS. 9 and 10, fixed to the beltline reinforcement 21 in an inclined state where its upper side Z1 is located on the inward side Y1 in the vehicle width direction. Thereby, the rotational support axis 24 (see FIG. 8) which extends coaxially with the electromotive rotational unit 13 is also provided to be inclined such that its upper side Z1 is located on the inward side Y1 in the vehicle width direction.

Figure 7:
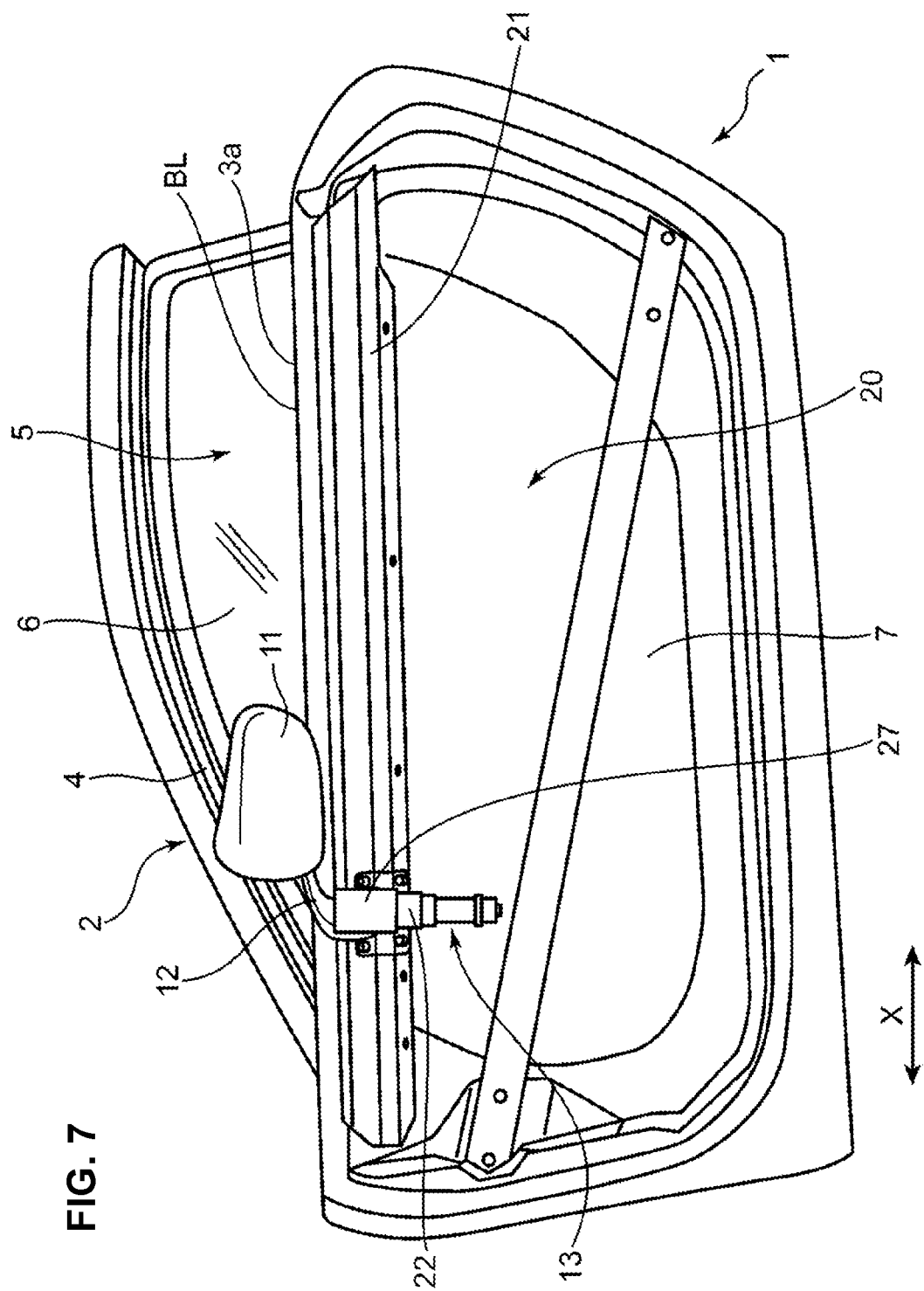
FIG. 7 is a view showing a state of the side door shown in FIG. 1 where an outer panel is removed and a beltline reinforcement provided inside the side door is exposed.

The beltline reinforcement 21 is a frame member which is provided inside the side door 1 to constitute a frame of the side door 1. As shown in FIG. 7, the beltline reinforcement 21 is fixed to a door inner 7 (see FIGS. 7 and 12) provided inside the side door 1 such that it extends in the vehicle longitudinal direction X along the beltline BL at a window lower-end edge (i.e., a lower-end edge of the door opening portion 5 where the door glass 6 is arranged). The beltline reinforcement 21 of the present embodiment is made of an aluminum-made extrusion material.

Specifically, as shown in FIGS. 8-12, the support member 22 comprises a semi-cylindrical shaped holding portion 22a and a pair of fixation portion 22b which are provided at both sides, in the vehicle longitudinal direction X, of the holding portion 22a. The holding portion 22a holds the casing 31 where the electromotive rotational unit 13 and the rotational support axis 24 are stored. The pair of fixation portions 22b are fastened to the beltline reinforcement 21 by bolts 28.

Further, in the present embodiment, as shown in FIGS. 9-12, a harness 25 extends from the space portion 20 inside the side door 1 to the door-mirror body portion 11 and is electrically coupled to the inner device 37 (e.g., the mirror-face adjusting unit) provided inside the door-mirror body portion 11.

Figure 11:
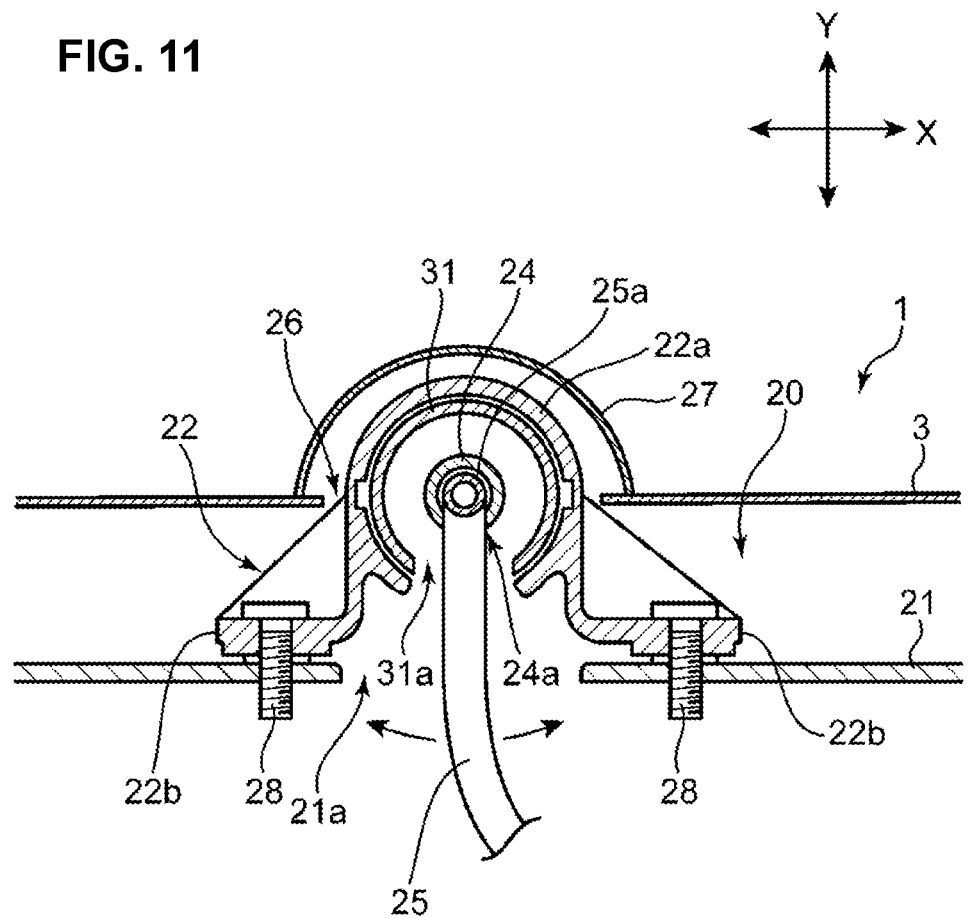
FIG. 11 is a sectional view taken along line XI-XI of FIG. 8.

Specifically, as shown in FIGS. 11 and 12, the beltline reinforcement 21 has a first opening 21a at a position thereof which faces the holding portion 22a of the support member 22. Further, a second opening 31a is formed at the casing 31 of the electromotive rotational unit 13 at a position which faces the first opening 21a. Further, the rotational support axis 24 of the present embodiment is of a hollow cylindrical shape, and a third opening 24a is formed at its peripheral surface at a position which faces the second opening 31a. Accordingly, the harness 25 extends from the inside of the side door 1 to the inside of the rotational support axis 24, passing through the first opening 21a of the beltline reinforcement 21, the second opening 31a of the casing 31, and the third opening 24a of the rotational support axis 24 (see a portion 25a of the harness 25 shown in FIG. 11 which extends upwardly passing through the inside of the rotational support axis 24). Further, the harness 25 extends to the inner device 37 provided inside the door-mirror body portion 11 passing through the respective insides of the rotational support axis 24 and the mirror base 12, and is electrically coupled to the inner device 37.

Herein, in the door mirror structure of the present embodiment, since the holding portion 22a of the support member 22 is of the semi-cylindrical shape, even if the harness 25 is arranged as described above, the casing 31 can be inserted into the holding portion 22a of the support member 22 from above without any interference of the harness 25 with the holding portion 22a.

The cover member 27 is configured to cover a gap between the penetration hole 26 and the rotational support axis 24 from the vehicle outside. Specifically, as shown in FIGS. 9-12, the casing 31 of the electromotive rotational unit 13 where the rotational support axis 24 is stored and the holding portion 22a of the support member 22 which covers the casing 31 are exposed to the vehicle outside through the penetration hole 26 of the outer panel 3. The cover member 27 covers the casing 31 and the holding portion 22a which store the rotational support axis 24 therein from the outside at a position located below the base-end portion 12a of the mirror base 12 and also covers a gap between the penetration hole 26 and the holding portion 22a.

Figure 13:
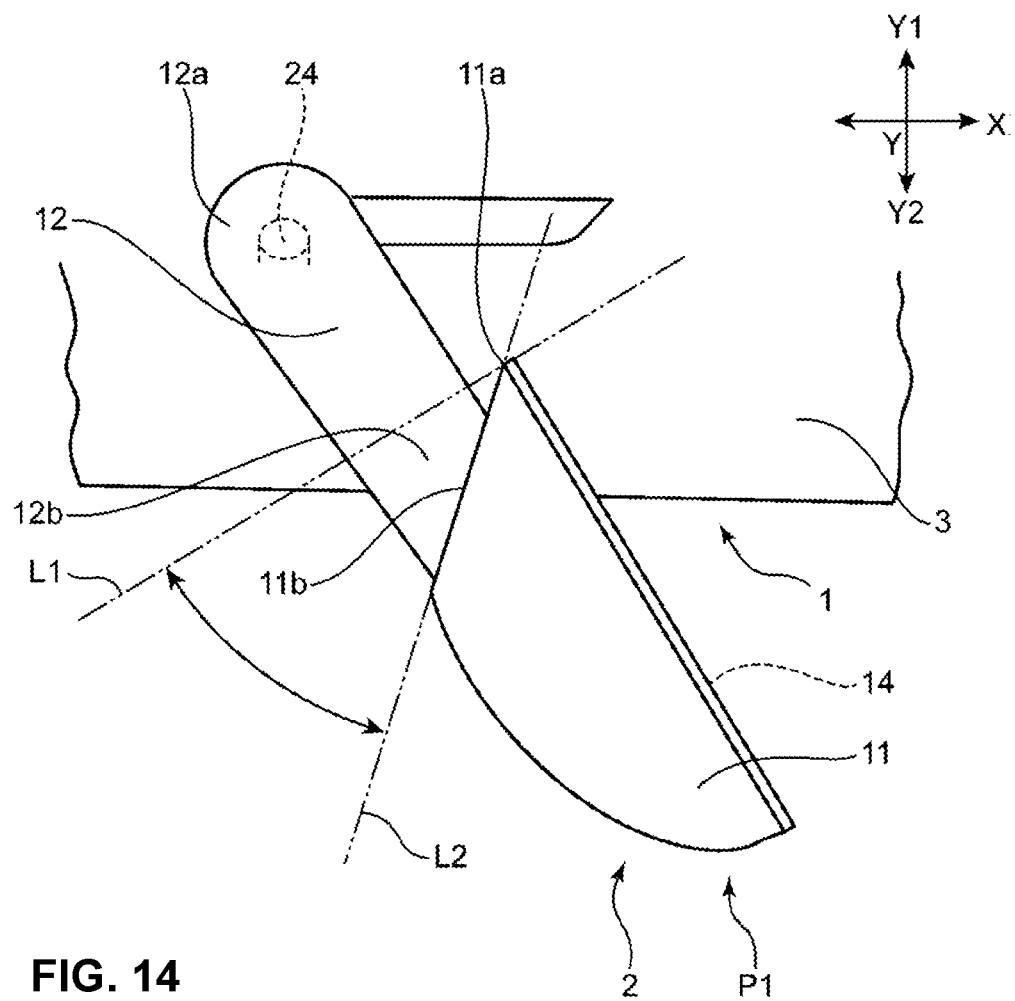
FIG. 13 is an explanatory diagram showing a state where an inner face of a door-mirror body portion is inclined toward a vehicle-outside relative to an imaginary line perpendicular to a surface of the mirror in the door mirror taking the mirror-use position shown in FIG. 3.

Further, as shown in FIG. 13, the door-mirror body portion 11 of the present embodiment is configured such that an inner face 11b of the door-mirror body portion 11 which faces the side door 1 is inclined toward the vehicle outside relative to an imaginary line L1 which passes through an inner-end portion 11a of the door-mirror body portion 11 perpendicularly to a surface of the mirror 14 in a plan view in the mirror-use position P1 (i.e., inclined in a direction away from the side door 1) for improvement of the visibility from the cabin inside. That is, the inner face 11b of the door-mirror body portion 11 extends along an imaginary line L2 which extends obliquely relative to the imaginary line L1 toward the vehicle outside with its start point of the inner-end portion 11a of the door-mirror body portion 11. In other words, the door-mirror body portion 11 taking the mirror-use position P1 shown in FIG. 13 is configured such that the width, in the longitudinal direction X, of the door-mirror body portion 11 becomes narrower from a middle position, in the vehicle width direction Y, of the door-mirror body portion 11 toward the inner-end portion 11a which is positioned on the side of the side door 1 in the vehicle width direction Y (becomes a taper shape).

Figure 14:
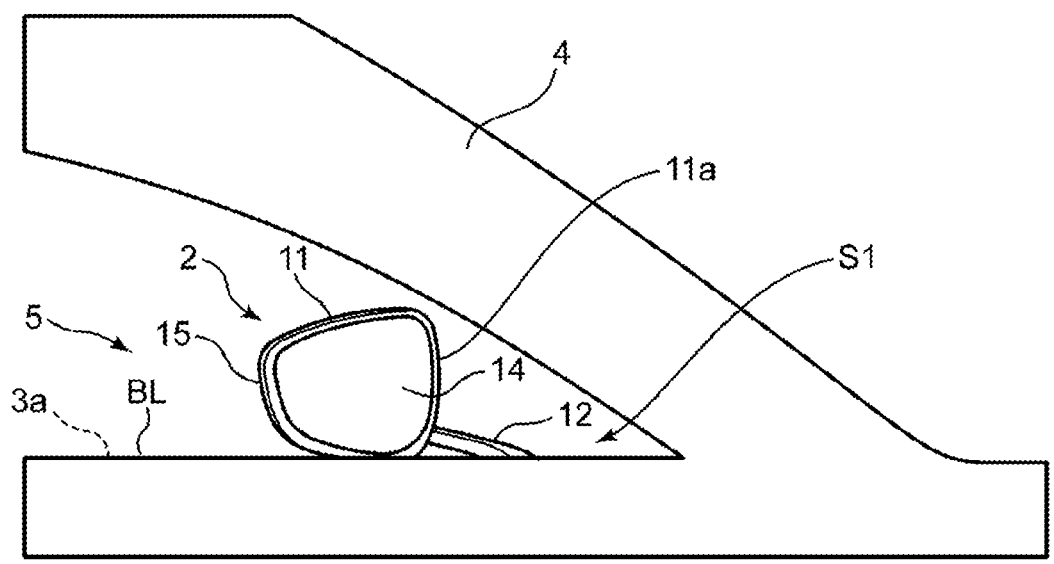
FIG. 14 is an explanatory diagram showing a state where the visibility from the cabin inside is improved because the inner face of the door-mirror body portion is not visible from the cabin inside in the door mirror taking the mirror-use position shown in FIG. 3.

By configuring (shaping) the door-mirror body portion 11 as described above, the visual field from the cabin inside is not interrupted by the inner face 11b of the door-mirror body portion 11 as shown in FIG. 14. Thereby, a visual field of a space S1 which is located in front of the door-mirror body portion 11, i.e., the space S1 which is enclosed by the inner-end portion 11a of the door-mirror body portion 11, the A pillar 4, and the beltline BL, can be secured widely, so that the visibility is improved.

Figure 15:
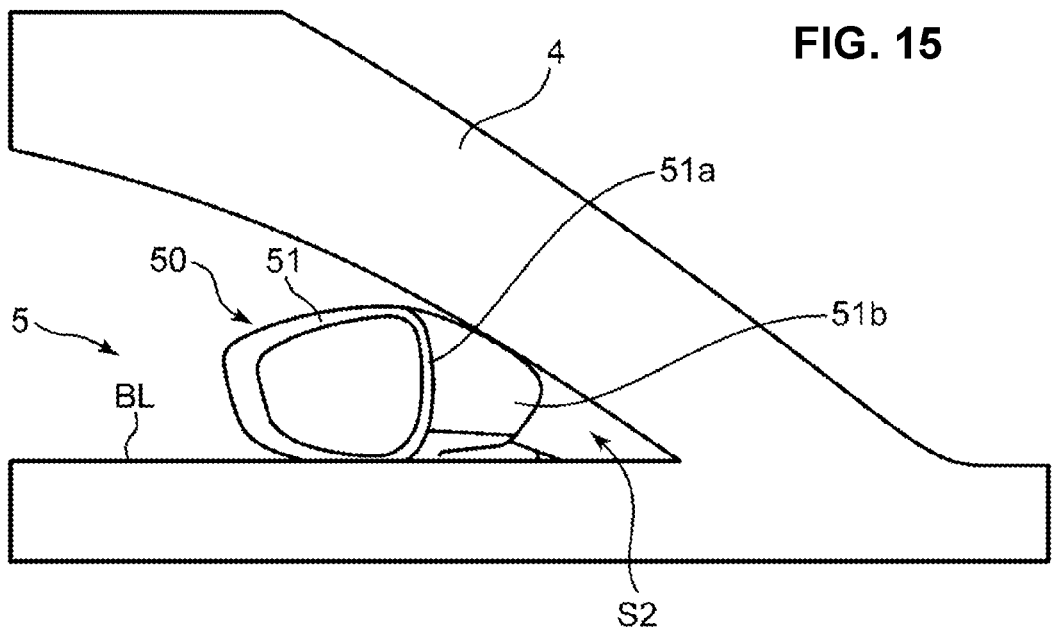
FIG. 15 is a diagram showing, as a comparative example of the present invention, a state of a conventional door mirror where since a longitudinal width of a door-mirror body portion which stores an electromotive rotational unit is large, an inner face of the door-mirror body portion is visible from the cabin inside, so that the visibility from the cabin inside is hindered.

For reference, in a structure in which the electromotive rotational unit (not illustrated) is stored at a door-mirror body portion 51 like a door mirror 50 which is shown in FIG. 15 as a comparative example, since the longitudinal width of the door-mirror body portion 51 becomes larger, an inner face 51b of the door-mirror body portion 51 becomes visible from the cabin inside. Accordingly, the space S2 which is located in front of the door-mirror-body portion 51, i.e., the space S2 which is enclosed by the inner-end portion 51a of the door-mirror body portion 51, the A pillar 4, and the beltline BL becomes narrower, so that it is apparent that the visibility is deteriorated.

Features of Present Embodiment

[1]

The door mirror structure of the present embodiment is the door mirror structure for the vehicle provided with the outer panel 3 as shown in FIGS. 1-10. The present door mirror structure comprises the door-mirror body portion 11 provided with the mirror 14 to obtain the rearward visual field of the vehicle, the mirror base 12 having the tip-end portion 12b fixed to the door-mirror body portion 11 and the base-end portion 12a provided away from the tip-end portion 12b, the rotational support axis 24 connected to the base-end portion 12a of the mirror base 12 and rotatably supporting the door-mirror body portion 11 and the mirror base 12 between the mirror-use position P1 where the mirror 14 is visible from the cabin inside and the mirror-storage position P2 which is located on the inward side Y1, in the vehicle width direction Y, of the mirror-use position P1, and the electromotive rotational unit 13 provided to rotate the door-mirror body portion 11 and the mirror base 12 between the mirror-use position P1 and the mirror-storage position P2 around the axis line of the rotational support axis 24.

As shown in FIGS. 7-12, the electromotive rotational unit 13 is provided at the side door 1. The rotational support axis 24 is provided to be inclined such that its upper side Z1 is located on the inward side Y1 in the vehicle width direction as shown in FIGS. 9, 10 and 16.

According to the present invention, since the electromotive rotational unit 13, which is a heavy object, is provided at the side door 1, the vertical moment generated at the door mirror which is caused by a road-surface input during the vehicle traveling (i.e., vibrations or outer forces which are mainly generated in the vertical direction, which may be caused by an unevenness (concave/convex) of the road surface) can be decreased, so that the vibrations of the mirror can be suppressed.

Further, since the electromotive rotational unit 13 is provided at the side door 1, the longitudinal width of the door-mirror body portion 11 can be shortened compared with a conventional door-mirror structure in which the electromotive rotational unit 13 is stored inside the door-mirror body portion 11, so that the visibility from the cabin inside can be improved.

Moreover, in the above-described structure comprising the door-mirror body portion 11 provided with the mirror 14 and the mirror base 12 having the tip-end portion 12b fixed to the door-mirror body portion 11, the electromotive rotational unit 13 rotates the door-mirror body portion 11 and the mirror base 12 from the mirror-use position P1 to the mirror-storage position P2. Accordingly, in a state where the door-mirror body portion 11 and the mirror base 12 are rotated to the mirror-storage position P2, respective protrusion quantities of the door-mirror body portion 11 and the mirror base 12 which protrude in the vehicle width direction Y from the side face of the side door 1 can be made small, so that the vehicle width can be properly minimized.

Additionally, in the above-described structure, the rotational support axis 24 is provided to be inclined such that its upper side Z1 is located on the inward side Y1 in the vehicle width direction as shown in FIGS. 9, 10 and 16. Accordingly, as shown in FIG. 16, in a state where the door-mirror body portion 11 takes the mirror-storage position P2 can be stored in a state where it falls down toward a surface of the outer panel 3 and approaches the outer panel 3, without contacting the outer panel 3. In this storage state, a surface 11d of the door-mirror body portion 11 which faces the outward side Y2 in the vehicle width direction can be further retreated toward the inward side Y1 in the vehicle width direction. Consequently, the vehicle appearance in the mirror-storage state of the door mirror can be improved and also the contacting of the door mirror with the object outside the vehicle can be avoided.

Figure 17:
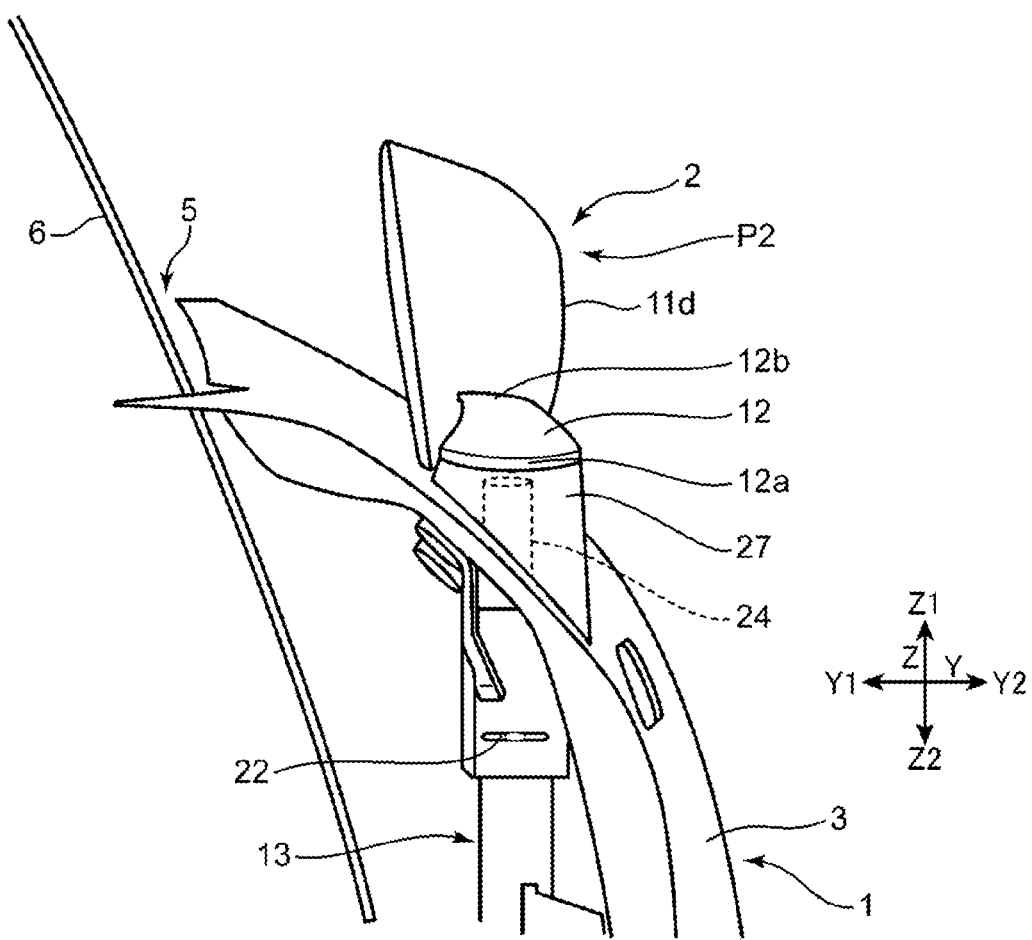
FIG. 17 is a view of the door mirror taking its storage position, as a comparative example of the present invention, in which the rotational support axis is not inwardly-inclined but in an upright state, when viewed from the vehicle forward side, which explains a state where the upright door-mirror body portion is unable to approach the outer panel because of its contacting with the outer panel.

Herein, in order to compare with FIG. 16, FIG. 17 shows a state of the door mirror taking its storage position P2 as a comparative example of the present invention, in which the rotational support axis 24 is not inclined toward the inward side Y1 in the vehicle width direction (not inwardly inclined) but in an upright state. In the comparative example shown in FIG. 17, since the door-mirror body portion 11 is moved (rotated) horizontally at the same level from the mirror-use position P1 to the mirror-storage position P2 in its upright state, the door-mirror body portion 11 comes to contact the outer panel 3 at the mirror-storage position P2, so that the door-mirror body portion 11 is unable to approach the outer panel 3 and configured to stand upwardly Z1 from the surface of the outer panel 3, which deteriorates the appearance. Further, in this storage state, the surface 11d of the door-mirror body portion 11 which faces the outward side Y2 in the vehicle width direction cannot be retreated sufficiently toward the inward side Y1 in the vehicle width direction. Accordingly, it is apparent that the door mirror structure of the comparative example shown in FIG. 17 is inferior to the door mirror structure of the present embodiment shown in FIG. 16 in improving the vehicle appearance in the door-mirror storage state and avoiding the contacting with the object outside the vehicle.

[2]

In the door mirror structure of the present embodiment, since the electromotive rotational unit 13 is provided inside the side door 1, the electromotive rotational unit 13 can be protected from a foreign substance or the like which exist in the vehicle outside by the outer panel 3 which constitutes the outside face of the side door 1. Herein, the electromotive rotational unit 13 may be positioned outside of the side door 1, but in this case, a large cover member to protect the electromotive rotational unit 13 or the like are required.

[3]

In the door mirror structure of the present embodiment, the penetration hole 26 where the rotational support axis 24 passes is formed at the outer panel 3 which constitutes the outside face of the side door 1. The door mirror structure further comprises the cover member 27 which covers a gap between the penetration hole 26 and the rotational support axis 24 from the vehicle outside.

According to this structure, since the cover member 27 covers the gap between the penetration hole 26 and the rotational support axis 24, the appearance of the vehicle is improved and also water can be prevented from coming into the inside of the outer panel 3 through the above-described gap.

[4]

The door mirror structure of the present embodiment further comprises the support member 22 to fix the electromotive rotational unit 13 to the side door 1. The electromotive rotational unit 13 is fixed to the beltline reinforcement 21 as the frame member which constitutes a frame of the side door 1 by the support member 22.

According to this structure, since the electromotive rotational unit 13 is fixed to the beltline reinforcement 21 as the frame member constituting the frame of the side door 1, the support rigidity of the electromotive rotational unit 13 is improved. Further, the above-described door mirror structure can be widely used at the conventional door structure by fixing the electromotive rotational unit 13 to the beltline reinforcement 21 which is generally used at the conventional door structure.

[5]

In the door mirror structure of the present embodiment, the beltline reinforcement 21 is made of the aluminum-made extrusion material. According to this structure, since the beltline reinforcement 21 is made of the aluminum-made extrusion material, securement of the support rigidity of the electromotive rotational unit 13 and light weight of the vehicle can be compatibly attained.

[6]

In the door mirror structure of the present embodiment, as shown in FIG. 16, the side door 1 further comprises the door glass 6 provided at the upper side Z1 of the outer panel 3. The door glass 6 is provided to be inclined such that its upper side Z1 is located on the inward side Y1 in the vehicle width direction.

According to this structure, since door glass 6 is provided to be inclined such that its upper side Z1 is located on the inward side Y1 in the vehicle width direction, the door-mirror body portion 11 taking the mirror-storage position P2 falls down toward the door glass 6, so that the door-mirror body portion 11 comes to take a parallel or nearly-parallel position relative to the door glass 6. Consequently, the vehicle appearance in the mirror-storage state is further improved.

[7]

In the door mirror structure of the present embodiment, the rotational support axis 24 is fixed to the base-end portion 12a of the mirror base 12 and configured to be rotatable around the axis line of the rotational support axis 24 together with the mirror base 12 by receiving a rotational drive force of the electromotive rotational unit 13.

According to this structure, the door-mirror body portion 11 and the mirror base 12 can be rotated between the mirror-use position P1 and the mirror-storage position P2 by rotating the door-mirror body portion 11 and the mirror base 12 around the rotational support axis 24 by means of the electromotive rotational unit 13. Accordingly, rotating of the door-mirror body portion 11 and the mirror base 12 between the mirror-use position P1 and the mirror-storage position P2 can be materialized with a simple structure.

[8]

In the door mirror structure of the present embodiment, the electromotive rotational unit 13 (specifically, the motor 32, the reduction gear 33, the torque limiter 34, and the output axis 35, which are primary structural elements of the electromotive rotational unit 13) is arranged on the axis line of the rotational support axis 24.

According to this structure, since the electromotive rotational unit 13 is arranged on the axis line of the rotational support axis 24, a system structure of drive-force transmission from the electromotive rotational unit 13 to the rotational support axis 24 can be made simple and compact. Thereby, arranging the electromotive rotational unit 13 in the space inside the side door 1 becomes possible.

[9]

In the door mirror structure of the present embodiment, as shown in FIG. 13, the door-mirror body portion 11 is configured such that the inner face 11b of the door-mirror body portion 11 which faces the side door 1 is inclined toward the vehicle outside relative to the imaginary line L1 which passes through the inner-end portion 11a of the door-mirror body portion 11 perpendicularly to the surface of the mirror 14 in the plan view in the mirror-use position P1.

According to this structure, since the door-mirror body portion 11 taking the mirror-use position P1 is configured such that the inner face 11b of the door-mirror body portion 11 is inclined toward the vehicle outside relative to the imaginary line L1 perpendicular to the surface of the mirror 14, the visual field from the cabin inside is not interrupted by the inner face 11b of the door-mirror body portion 11. Consequently, the visibility from the cabin inside is secured at the maximum, thereby improving the visibility further.

In the door mirror structure of the present embodiment, as shown in FIG. 13, the door-mirror body portion 11 taking the mirror-use position P1 is configured such that the width, in the longitudinal direction X, of the door-mirror body portion 11 becomes narrower from the middle position, in the vehicle width direction Y, of the door-mirror body portion 11 toward the inner-end portion 11a, in the vehicle width direction Y, of the door-mirror body portion 11 in the plan view.

According to this structure, since the longitudinal width of the door-mirror body portion 11 becomes narrower from the middle position toward the inner-end portion 11a, the visual field from the cabin inside is not interrupted by the inner face 11b of the door-mirror body portion 11. Consequently, the visibility from the cabin inside is so secured at the maximum that the visibility can be improved further.

Modified Examples

[A]

While the door mirror structure of the above-described embodiment is configured such that the rotational support axis 24 is inclined only toward the inward side Y1 in the vehicle width direction (inwardly inclined) and not inclined in the vehicle longitudinal direction X, the present invention is not limited to this structure. As a modified example of the present invention, the rotational support axis 24 may be provided to be inclined not only toward the inward side Y1 but such that its upper side Z1 is located on the vehicle forward side X1 as shown in FIG. 18 in order to store the door-mirror body portion 11 in a state where it approaches the door opening portion 5.

Figure 18:
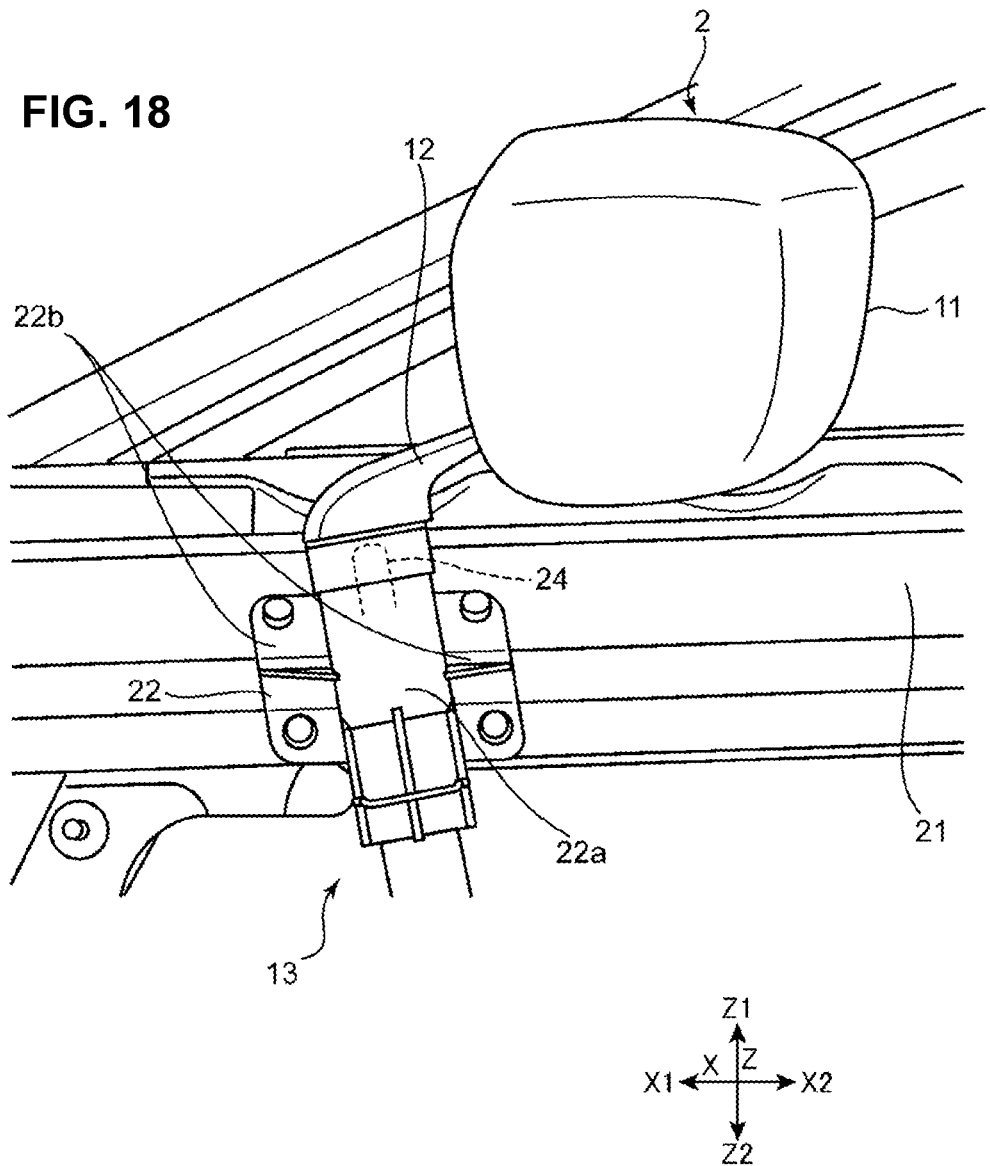
FIG. 18 is an explanatory diagram showing a door mirror structure, as a modified example of the present invention, in which the rotational support axis is inclined not only inwardly but forwardly.

In the modified example shown in FIG. 18, the electromotive rotational unit 13 is fixed to the beltline reinforcement 21 in a state where it is inclined such that its upper side Z1 is located on the vehicle forward side X1. Thereby, the rotational support axis 24 which extends coaxially with the electromotive rotational unit 13 is provided to be inclined such that its upper side Z1 is located on the vehicle forward side X1 as well.

Figure 19:
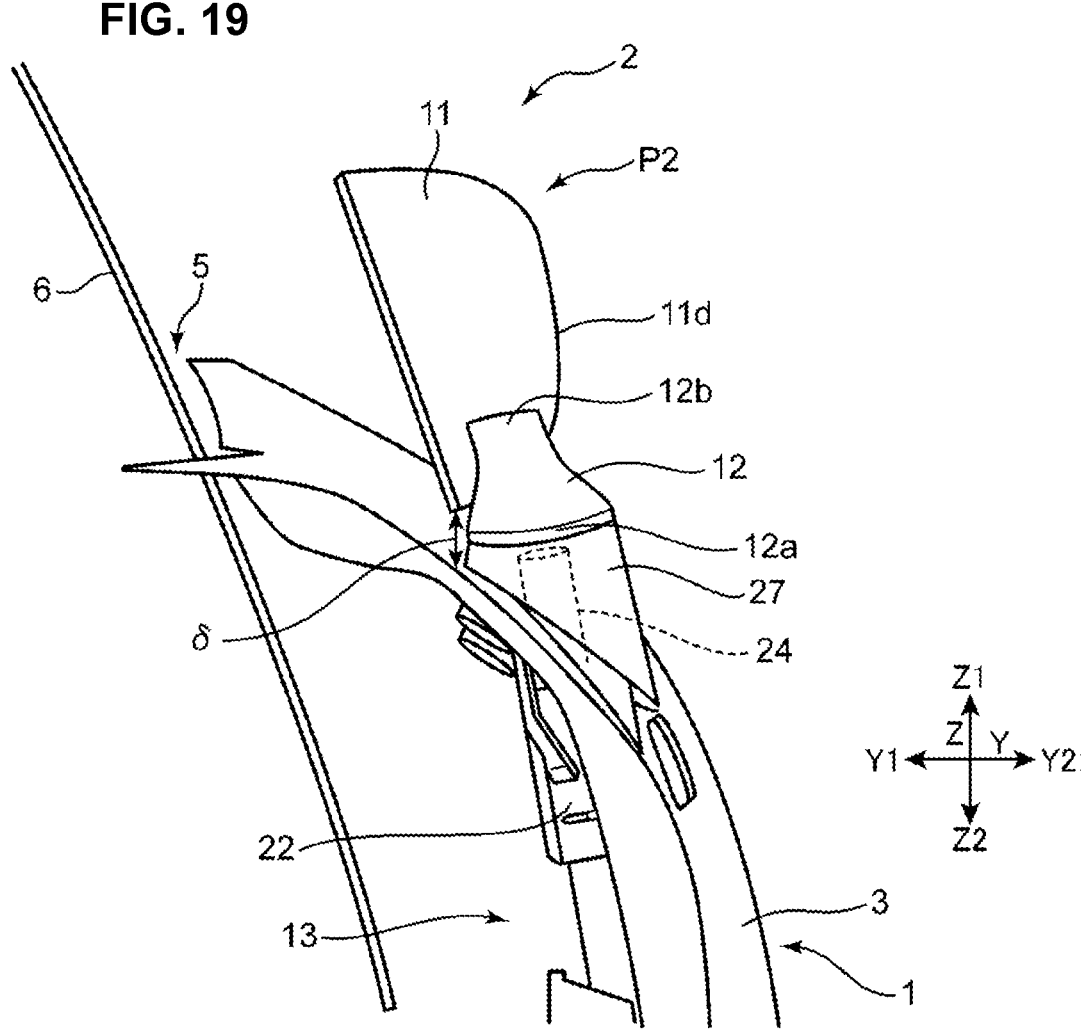
FIG. 19 is an explanatory diagram showing a state where the door-mirror body portion falls down toward the outer panel and further approaches the outer panel due to the inwardly-and-forwardly inclined rotational support axis shown in FIG. 18.

In the modified example shown in FIGS. 18 and 19, the rotational support axis 24 is provided to be inclined not only toward the inward side Y1 but such that its upper side Z1 is located on the vehicle forward side X1. Accordingly, as shown in FIG. 19, the door-mirror body portion 11 having the mirror-storage position P2 is located upwardly Z1 away from the outer panel 3 of the side door 1 so that a gap δ can be secured between the door-mirror body portion 11 and the outer panel 3. Therefore, the door-mirror body portion 11 taking the mirror-storage position P2 can be stored in a state where it is positioned upwardly Z1 and inwardly Y1 (specifically, in a direction approaching the door opening portion 5), in the vehicle width direction Y, relative to the outer panel 3, without contacting the outer panel 3. Consequently, the vehicle appearance in the mirror-storage state of the door mirror 2 can be further improved and also the contacting of the door mirror 2 with the object outside the vehicle can be further avoided.

[B]

While the present embodiment is configured such that the rotational support axis 24 is fixed to the base-end portion 12a of the mirror base 12 and rotatable around the axis line S of the rotational support axis 24 (see FIG. 12) together with the mirror base 12 by receiving the rotational drive force of the electromotive rotational unit 13, the present invention is not limited to this structure. The present invention is attained as long as the rotational support axis 24 is connected to the base-end portion 12a and the electromotive rotational unit 13 rotates the door-mirror body portion 11 and the mirror base 12 around the axis line S of the rotational support axis 24. Accordingly, there may be a modified example of the present invention, in which the rotational support axis 24 is provided as a non-rotational axis, the base-end portion 12a of the mirror base 12 is attached to the rotational support axis 24 so as to rotate relative to the rotational support axis 24, and the electromotive rotational unit 13 is configured to rotate the mirror base 12 directly, not indirectly via the rotational support axis 24.

[C]

The mirror of the present invention includes any type as long as means for obtaining the rearward visual field is adopted. For example, the optical mirror 14 to obtain the rearward visual filed by reflection of the light from the vehicle rearward side or a so-called digital mirror capable of obtaining the rearward visual field by means of a television camera provided at the door-mirror body portion 11 are included in the concept of the mirror of the present invention.

What is claimed is:

1. A door mirror structure of a side door for a vehicle provided with an outer panel, comprising:
    a door-mirror body portion provided with a mirror to obtain a rearward visual field of the vehicle;
    a mirror base having a tip-end portion fixed to the door-mirror body portion and a base-end portion provided away from the tip-end portion;
    a rotational support axis connected to the base-end portion of the mirror base and rotatably supporting the door-mirror body portion and the mirror base between a mirror-use position where the mirror is visible from a cabin inside and a mirror-storage position which is located on an inward side, in a vehicle width direction, of the mirror-use position;
    an electromotive rotational unit provided to rotate the door-mirror body portion and the mirror base between the mirror-use position and the mirror-storage position around an axis line of the rotational support axis; and
    a support member to fix said electromotive rotational unit to said side door,
    wherein said electromotive rotational unit is provided at the side door, and said rotational support axis is provided to be inclined such that an upper side thereof is located on the inward side in the vehicle width direction, and
    the electromotive rotational unit is fixed to a beltline reinforcement which extends in a vehicle longitudinal direction along a beltline at a window lower-end edge of the side door by said support member.

2. The door mirror structure of claim 1, wherein said electromotive rotational unit is provided inside the side door.

3. The door mirror structure of claim 2, wherein a penetration hole where said rotational support axis passes is formed at said outer panel, and a cover member which covers a gap between said penetration hole and said rotational support axis from a vehicle outside is further provided.

4. The door mirror structure of claim 3, wherein said rotational support axis is provided to be inclined such that the upper side thereof is located on a vehicle forward side.

5. The door mirror structure of claim 4, wherein said side door further comprises a door glass provided at an upper side of the outer panel, and said door glass is provided to be inclined such that an upper side thereof is located on the inward side in the vehicle width direction.

6. The door mirror structure of claim 5, wherein said rotational support axis is fixed to said base-end portion of the mirror base and configured to be rotatable around the axis line of the rotational support axis together with the mirror base by receiving a rotational drive force of said electromotive rotational unit.

7. The door mirror structure of claim 1, wherein a penetration hole where said rotational support axis passes is formed at said outer panel, and a cover member which covers a gap between said penetration hole and said rotational support axis from a vehicle outside is further provided.

8. The door mirror structure of claim 1, wherein said rotational support axis is provided to be inclined such that the upper side thereof is located on a vehicle forward side.

9. The door mirror structure of claim 1, wherein said side door further comprises a door glass provided at an upper side of the outer panel, and said door glass is provided to be inclined such that an upper side thereof is located on the inward side in the vehicle width direction.

10. The door mirror structure of claim 1, wherein said rotational support axis is fixed to said base-end portion of the mirror base and configured to be rotatable around the axis line of the rotational support axis together with the mirror base by receiving a rotational drive force of said electromotive rotational unit.

* * * * *